US008465558B2

(12) United States Patent
Eriksson et al.

(10) Patent No.: US 8,465,558 B2
(45) Date of Patent: Jun. 18, 2013

(54) BIOFUEL

(75) Inventors: Lars Eriksson, Trangsund (SE); Borje Gevert, Hisings Karra (SE)

(73) Assignee: Ecotraffic ERD3 AB, Eden (SE)

( * ) Notice: Subject to any disclaimer, the term of this patent is extended or adjusted under 35 U.S.C. 154(b) by 187 days.

(21) Appl. No.: 12/867,505

(22) PCT Filed: Feb. 10, 2009

(86) PCT No.: PCT/SE2009/050137
§ 371 (c)(1),
(2), (4) Date: Aug. 13, 2010

(87) PCT Pub. No.: WO2009/102272
PCT Pub. Date: Aug. 20, 2009

(65) Prior Publication Data
US 2010/0325942 A1 Dec. 30, 2010

(30) Foreign Application Priority Data

Feb. 14, 2008 (SE) ....................... 0800332

(51) Int. Cl.
*C10L 1/02* (2006.01)
*C10L 1/32* (2006.01)
*C10L 8/00* (2006.01)

(52) U.S. Cl.
USPC ................................. 44/307; 44/604; 44/605

(58) Field of Classification Search
USPC ................... 44/280–282, 307, 436, 451, 500, 44/502, 504, 605, 606, 304, 604
See application file for complete search history.

(56) References Cited

U.S. PATENT DOCUMENTS

| 4,378,381 | A | 3/1983 | Turbak |
| 4,875,905 | A | 10/1989 | Somerville |
| 7,195,656 | B2 | 3/2007 | Appleby |
| 2001/0013197 | A1 | 8/2001 | White |
| 2004/0159042 | A1* | 8/2004 | Murcia ........................... 44/500 |
| 2005/0253108 | A1* | 11/2005 | Tran et al. ....................... 252/70 |
| 2006/0053684 | A1 | 3/2006 | Murcia |
| 2007/0113465 | A1* | 5/2007 | Pech et al. ...................... 44/308 |

FOREIGN PATENT DOCUMENTS

| DE | 202006011668 U1 | 11/2006 |
| EP | 1918354 A1 * | 5/2008 |
| GB | 297085 A | 8/1929 |
| HU | 0001665 A2 | 6/2002 |
| JP | 2004285312 A | 10/2004 |
| WO | 9610067 A1 | 4/1996 |
| WO | WO 9610067 A1 * | 4/1996 |
| WO | 2006031175 A1 | 3/2006 |
| WO | 2006038863 A1 | 4/2006 |
| WO | WO 2007029851 A1 * | 3/2007 |
| WO | 2009006661 A1 | 1/2009 |

OTHER PUBLICATIONS

Tech Group Message (2006).*
International Search Report & Written Opinion mailed Nov. 6, 2009 in parent PCT Application.
Supplementary European Search Report (completed Aug. 25, 2011) for corresponding European application.
Demirbas A, Linear Equations on Thermal Degradation Products of Wood Chips in Alkaline Glycerol, Energy Conversion and Management, Elsevier Science Publishers, Oxford, GB, vol. 45, No. 7-8, May 1, 2004, pp. 983-994.
Database WPI, Week 200258, Thomson Scientific, London, GB, AN 2002-540776.

* cited by examiner

*Primary Examiner* — Pamela H Weiss
(74) *Attorney, Agent, or Firm* — Jeffrey S. Melcher; Manelli Selter PLLC

(57) ABSTRACT

A biofuel product comprises a slurry of pulverized combustible solid biomass material in a combustible liquid product of vegetable origin. In accordance with the invention, the product of vegetable origin is glycerol, and a mixture ratio between the glycerol and the pulverized solid biomass material is such, that the slurry at least upon heating to around 90° C. has a low viscosity and is pumpable. The glycerol utilized is obtained as a byproduct in the production of biodiesel fuel or soap, fatty acids, fatty alcohols or alkyl esters, and the pulverized combustible solid biomass material preferably is lignin powder, and/or wood powder and/or other pulverized vegetable solid biomass material, such as peat, and/or powder of carbon from vegetable material. The biofuel product may be used as a replacement for heavy fuel oil, for example.

14 Claims, No Drawings

BIOFUEL

TECHNICAL FIELD

The present invention relates to a bio fuel product comprising a slurry of pulverized combustible solid biomass material in a combustible liquid product of vegetable origin.

It also relates to a method of producing the biofuel product and to a method of utilizing glycerol obtained as a byproduct in the manufacture of inter alia biodiesel fuel.

In many contexts, the term "bio fuel" is defined as a fuel that is produced from living organisms (biomass), which, in contrast to fossil fuels, have not been outside the natural circulation for millions of years. However, there are different opinions as to whether peat is a bio fuel or not. Peat is renewed slowly in comparison with energy crops and forest fuel, which have a production time of 1-100 years. It takes some thousand years for peat to form. Many of the swampy grounds in Sweden started forming when the inland ice retracted, which in the south of Sweden happened about 10,000 years ago. The fossil fuels coal, oil and natural gas were formed between 50 and 500 million years ago.

The Swedish Peat report from 2002 held that peat should be classified just as peat and not be placed in categories as fossil/non-fossil or renewable/non-renewable. In the peat line of trade, people are of the opinion that peat should be regarded as bio fuel as long as the amount of peat-digging each year does not exceed the yearly growth. In Finland, peat is classified as a slowly renewable fuel, while the EU and many international agencies classify peat as a fossil fuel. In the present context, peat is regarded as a biofuel.

BACKGROUND ART

In contrast to fossil fuels, the combusting of biofuels in principle gives no contribution of carbon dioxide to the atmosphere. The amount of carbon dioxide that is formed during the combustion is exactly the same amount that the plant has assimilated during its growth, and as long as the fresh growth is as large as the extraction, the carbon dioxide content in the atmosphere will not increase. Consequently, in case the use of biofuels suddenly increases, the carbon dioxide content into atmosphere will increase temporarily, until the biomass can grow back and compensate for the emissions.

In this manner, the use of biofuels will deliver rather large amounts of carbon dioxide for 20-30 years ahead (until 2030-2040), since the firing of biofuels has increased largely during the latest decennium and probably will continue to increase during the twenty-tens. Researchers from SLU (the Swedish University of Agricultural Sciences) and IVL (the Swedish Environmental Institute) have shown in a report from Elforsk (Report No. 07:35) that firing of bio fuel probably is more climate affecting than if natural gas were used for covering the same energy demand during the next 20 years. That bio fuel in spite thereof is regarded as carbon dioxide neutral is based on that the use is viewed from a 100 years approach and that the use is maintained constant or is reduced.

Bio fuels are used for generation of electricity and heat and for motor fuels. In countries having a developed pulp and paper industry, like Sweden, Finland and Canada, this industry accounts for a major portion of the use.

Usual biofuels are tree fuels, spent liquors in the pulp industry, and refuse. Tree fuels come from raw material of wood and may be firewood, logging waste (stumps, branches, tops and bark, et cetera), for example, or energy forest. Another very common bio fuel is the mixture of chemicals and dissolved organic material formed at chemical pulp mills, often called spent, waste or residual liquor or in most cases black liquor. The liquor is combusted at the mill and is an important source for both heat and electricity.

Biodiesel is the name for a motor fuel, which till now has been produced by transesterification of vegetable oil or esterification of fats, but biodiesel may also be produced by hydrogenation of primarily fats and vegetable oils. Sometimes also the designation FAME (Fatty Acid Methyl Ester) is used for biodiesel. In principle any type of fat can be used for production of biodiesel. The choice is mainly decided by price and availability of the raw material. In Sweden, rapeseed is most common, and then the fuel is called RME (Rapeseed Methyl Ester). In the U.S., most often soybean oil or maize oil is used. Also palm oil, mustard oil or algae may be used. The transesterification is started by adding methanol or ethanol and alkali in the presence of a catalyst to obtain monoalkyl esters and glycerol, which are removed.

Consequently, upon producing biodiesel, glycerol (also known as glycerin, propane-1,2,3-triol, trihydroxy-propane, $CH_2OH$—$CHOH$—$CH_2OH$) is obtained as a byproduct. This has lead to that the yearly production of glycerol in the U.S. in recent years has amounted to 350,000 tons and in Europe 600,000 tons. These figures will increase by the implementation of the E.U. Directive 2003/30/EC, which requires that 5.75% of the petroleum fuels be replaced by bio fuels in all states.

In HU 0001665 A2 there is disclosed a proposition to combust byproducts from production of biodiesel, e.g. sun flower husks and contaminated glycerol, together to produce energy.

US 2004/0159042 A1 discloses a biofuel product formed by a mixture of a powder, which may be either a dried cellulose containing product, powder of charcoal, and/or a combination thereof and a liquid, which may be a vegetable oil, vegetable alcohol or a combination thereof. Vegetable oil is glycerol esters, and the oil molecule consists of three carboxylic acids residues attached to a glycerol molecule. As glycerol makes the oil thick and sticky, in order to be transformed into a fuel, the oil must go through a transesterification process, whereby the esters are separated from the glycerol and alcohol is substituted for the glycerol. The vegetable alcohols used for this purpose are ethanol and ethanol. The oil and/or the alcohol or a mixture thereof is used in form of microdrops for moistening the powder. It is stated that by mixing 5-10 gallons (18.9-27.8 liters) of biodiesel per ton of dry powder, a biofuel product is obtained, which is in a liquid cream state and may serve as a replacement for or additive to conventional liquid fossil fuels, such as for heating purposes.

Further, it is proposed in U.S. Pat. No. 7,195,656 B2 to reduce emissions of $NO_x$ when combusting pulverized coal by co-firing an oxygen containing compound selected from the group consisting of glycerol, glycerol derivates, propylene glycol, propylene glycol derivates, ethylene glycol, ethylene glycol derivates, fatty acid alkyl esters, fatty alcohols, and mixtures thereof. Concerning glycerol, it is typically obtained as a byproduct when producing soaps, fatty acids, fatty alcohols and alkyl esters. Another possible source is stated to be from the hydrogenation or the enzymatic conversion of glucose, sorbitol and other sugars to glycerine or other polyols. Yet another source is waste products of ethanol fermentation. Synthetic glycerol may also be obtained from propylene, typically in Dow Chemical's process for production of epichlorohydrin from allyl chloride. Also all in all, this does not add up to a large amount of glycerol that is desirable to utilize. In addition, even if the glycerol would be mixed with the pulverized coal, no bio fuel product harmless to the environment would be obtained, since coal is a fossil fuel that contributes to increased carbon dioxide emissions.

PARTICULARS OF THE INVENTION

From one angle of the present invention, an object is to utilize the glycerol obtained as a byproduct in the production of biodiesel fuel.

From another angle, an object of the invention is to provide a new bio fuel product.

In a biofuel product comprising a slurry of pulverized combustible solid biomass material in a combustible liquid product of vegetable origin, these objects are achieved in accordance with the present invention in that the product of vegetable origin is glycerol, and that a mixture ratio between the glycerol and the pulverized solid biomass material is such, that the slurry at least upon heating has a low viscosity.

The glycerol included in the slurry preferably is a byproduct from production of biodiesel fuel or soap, fatty acids, fatty alcohols or alkyl esters. When being a byproduct from production of biodiesel by transesterification of vegetable oil with methanol, it has a methanol content of less than 0.5% by weight and a negligible content of water.

In a first preferred embodiment of the invention, the pulverized combustible solid biomass material includes lignin powder. Also the lignin is a waste or byproduct, which may be extracted at various forest-based industries and is marketed in form of powder, primarily for combustion. The powder may be pelletized for combustion in heating plants, and it is also possible that in future it might be combusted in gas turbines. However, feeding powder or pellets into a gasification plant meets with difficulties, as gasification plants are pressurized.

Suitably, 3 parts by weight of glycerol are mixed with up to 5 parts by weight of lignin powder, advisably at least an equal number of parts by weight. If 3 parts by weight of glycerol are mixed with 5 parts by weight of lignin powder, a biofuel product is obtained, which is firm or very viscous at room temperature but will have a low viscosity when heated to 90° C., for example. The hotter the mixture is, the lower viscosity it will have, and additionally, in a heated bio fuel product, more lignin can be intermixed. The lignin containing bio fuel product is comparable to No. 5 fuel oil (heavy fuel oil, furnace fuel oil), and after heating, usually by a recirculated low pressure steam system, it can be pumped from a tank to be used as a pumpable fuel in solid fuel furnaces and as fuel in gasification plants. It can also be used as fuel in soda recovery boilers and other suitable places for combustion of sulfurous fuels, as the sulfur is needed in the sulfate process. It is also suitable for use as fuel when producing cement in cement furnaces both of fluidized bed type and rotary type, further also in similar furnaces used for calcination of lime sludge in sulfate pulp mills and for other calcinations of limestone, such as at sugar mills.

In the present context, the term "pumpable" means that the slurry, when heated to about 90° C., has a dynamic viscosity on the order of at most 2000 mPa·s. The viscosity of the slurry is strongly affected by its water content, and an addition of pulverized combustible solid biomass material to glycerol may even reduce the viscosity of the formed slurry, since the biomass material contains some water as it would be unprofitable to dry it completely before burning it. When using lignin powder, it may have a water content of about 30% by weight, for example, thereby avoiding a final drying step in the production of the powder. To maximize the lignin content of the slurry, temperatures on the order of 90° C. before the pump are required. If desired, the temperature can be raised after the pump, because then the slurry is pressurized.

In another preferred embodiment of the invention, the pulverized combustible solid biomass material includes pulverized vegetable solid biomass material, preferably wood, like sawdust, powder or dust of wood. As an example, a mixture of 9 parts by weight of glycerol and 1 part by weight of pulverized wood gives a biofuel product, which is pumpable at room temperature, while a mixture of 5 parts by weight of glycerol and 1 part by weight of pulverized wood gives a biofuel product, which at room temperature is of paste consistency, more or less like tube packed provisions. It deserves mentioning, that pure glycerol has a melting point of 18° C., and around 20° C. the viscosity is very influenced by the temperature. As mentioned above, the viscosity of the slurry is strongly affected by its water content, and when using wood powder, it may have a water content on the order of 10-20% by weight, thereby avoiding a final drying step in the production of the powder.

Instead of wood, other vegetable material may be used, such as peat, agricultural waste like ground corncobs, stems and stalks, and straw et cetera, and also farm products. When peat is used as vegetable material, a mixture of 10 parts by weight of glycerol and 4-5 parts by weight of peat give a biofuel product of paste consistency, while a pumpable biofuel product is obtained when mixing 10 parts by weight of glycerol with up to 3 parts by weight of peat. A suitable temperature for pumping the peat slurry, which resembles the wood powder slurry, is 60° C. Both wood powder and peat give a high consumption of glycerol. Wood, wood powder and sawdust may be treated at high temperature and carbonized to various degrees. Such carbonization gives a more hydrophobic wood having reduced absorbing capacity for glycerol and the carbonized material works well in the present invention.

In a third preferred embodiment of the invention, the pulverized combustible solid biomass material includes carbon of vegetable solid biomass material, e.g. wood. Then the carbon may be in powder form and be mixed with the glycerol in the same proportions as the wood powder.

The bio fuel product of the invention is produced in that hot or room temperature glycerol is mixed with lignin, carbon and/or vegetable material, e.g. wood, by stirring. During the stirring, possible grains, granules or powder lumps of the pulverized combustible solid biomass material will be disintegrated. To facilitate the mixing, the glycerol preferably is heated to a temperature on the order of 90° C. before the pulverized combustible solid biomass material is added. It is believed important to have a low viscosity in the slurry, so as to permit the powder particles slide past one another without adhering. If the slurry is too viscous in spite of heating, some water may be added. Of course, if desired, the water may be added to the glycerol before the powder is stirred thereinto.

The resulting biofuel products may be grouped in three groups, viz.

- a mixture A, which is very viscous at room temperature (i.e. a paste) and consists essentially of glycerol and pulverized solid vegetable biomass material, such as wood or powder of carbon from vegetable biomaterial,
- a mixture B, which is liquid at room temperature and consists essentially of glycerol and pulverized solid vegetable biomass material, such as wood or powder of carbon from vegetable biomaterial,
- a mixture C of glycerol and lignin. In the present context, the term lignin designates all kinds of lignin that can be obtained from liquid from the pulp industry. One example of suitable lignin is the one that is extracted from black liquor by LignoBoost's technology (WO2006/031175 and WO2006/038863). Lignin obtained as a byproduct has a fairly low molecular weight in comparison to the lignin in wood, where the lignin forms macromolecules.

Bio fuel product A, which is of a composition such that it will have a low viscosity upon heating, e.g. to 90° C., may be used as a pumpable fuel in solid fuel furnaces and as fuel in gasification plants. If desired, it may also be used as an environmentally friendly alternative to igniters for grills, stoves and log fires. In the later use, the product suitably is packed in a tube, from which it can be squeezed out, or as paste spread in a can.

Biofuel product B can be used as pumpable fuel in solid fuel furnaces and as fuel in gasification plants. By being pumpable, the fuel can easily be introduced in the gasification plant.

Also bio fuel product C can be used as a pumpable fuel in solid fuel furnaces and as fuel in gasification plants. By being pumpable, the fuel can easily be introduced in the gasification plant. It can be used as fuel in soda recovery boilers and other suitable places for firing sulfurous fuels, as the sulfur is needed in the sulfate process to maintain the sulfidity in the process.

Further, bio fuel product B can be used as pumpable fuel in lime sludge reburning kilns, and B and C can be used as fuel when producing cement in cement kilns, both of fluidized bed type and of rotary type, and they can also be used in furnaces intended for firing with oil.

Tanks and other equipment used for the pumpable fuels B and C can be cleaned easily with hot water or steam.

The invention claimed is:

1. A method of producing a biofuel slurry, the method comprising:
   providing a combustible biomass powder comprising lignin powder;
   providing a liquid glycerol of vegetable origin; and
   mixing the powder and the glycerol to form a slurry having a dynamic viscosity that is below 2000 mPa-s at 90 degrees Celsius, wherein the powder and the glycerol are mixed at a ratio of 3 parts by weight glycerol and up to 5 parts by weight of powder.

2. A method according to claim 1, further comprising adding water to the slurry.

3. A method according to claim 1, wherein the powder includes pulverized peat.

4. A method according to claim 1, wherein the powder has a water content between 10% and 30% by weight.

5. A method of producing a biofuel slurry, the method comprising:
   providing a combustible biomass powder comprising lignin powder;
   providing a liquid glycerol of vegetable origin; and
   mixing the powder and the glycerol to form a slurry having a dynamic viscosity that is below 2000 mPa-s at 90 degrees Celsius, wherein the powder and the glycerol are mixed at a ratio of at least 1 part by weight of powder per 1 part by weight of glycerol.

6. A method according to claim 1, wherein the glycerol results from a transesterification of an oil created by algae.

7. A method according to claim 1, wherein the powder includes a sawdust.

8. A method according to claim 1, wherein the powder and the glycerol are mixed at a ratio of up to 1 part by weight of powder per 1 part by weight of glycerol.

9. A method according to claim 1, wherein the slurry has a viscosity of at most 2000 mPa-sec at room temperature.

10. A method according to claim 1, wherein the powder includes a pulverized peat and a sawdust.

11. A method according to claim 1, wherein the powder includes at least two of a pulverized peat, a sawdust, and a pulverized, carbonized vegetable material.

12. A method according to claim 1 wherein the powder and the glycerol are mixed at a ratio of up to 3 parts by weight of powder per 10 parts by weight of glycerol.

13. A method according to claim 1, wherein:
   the powder includes lignin powder and sawdust;
   the powder has a water content between 10% and 30% by weight; and
   the powder and the glycerol are mixed at a ratio of up to 3 parts by weight of powder per 10 parts by weight of glycerol.

14. A method of producing a biofuel slurry, the method comprising:
   providing a combustible biomass powder comprising lignin powder;
   providing a liquid glycerol of vegetable origin; and
   mixing the powder and the glycerol to form a slurry having a dynamic viscosity that is below 2000 mPa-s at 90 degrees Celsius, wherein the powder and the glycerol are mixed at a ratio 1-10 parts by weight glycerol per 1-5 parts by weight of powder.

\* \* \* \* \*